July 18, 1967 J. C. CHRISTOPHEL 3,331,406
RADIAL SAW
Filed March 3, 1964 5 Sheets-Sheet 1
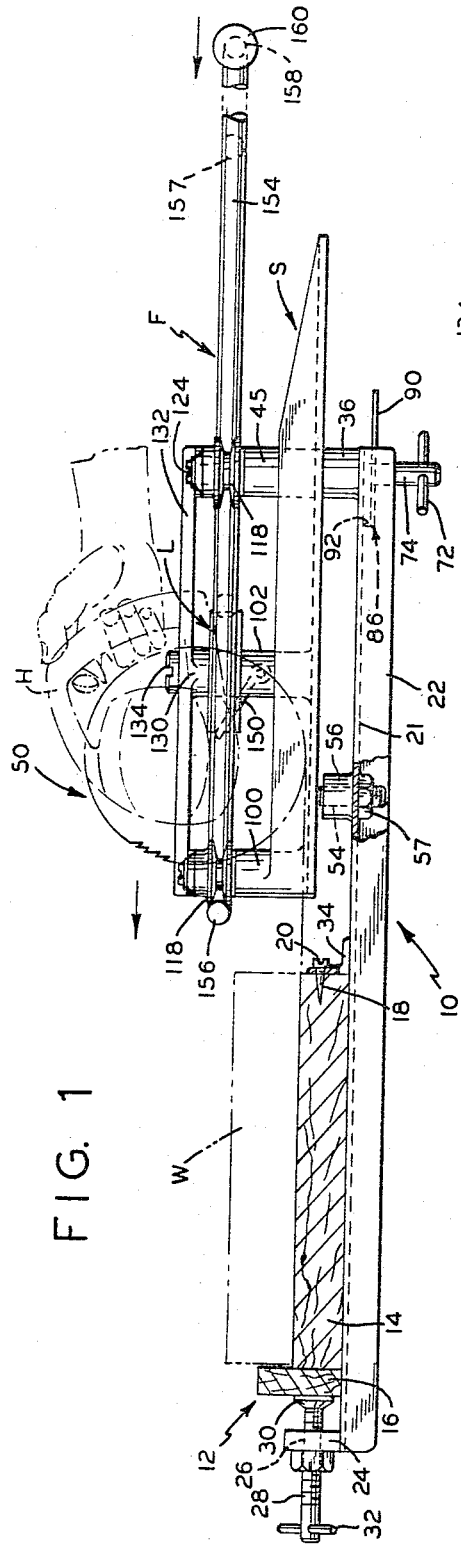
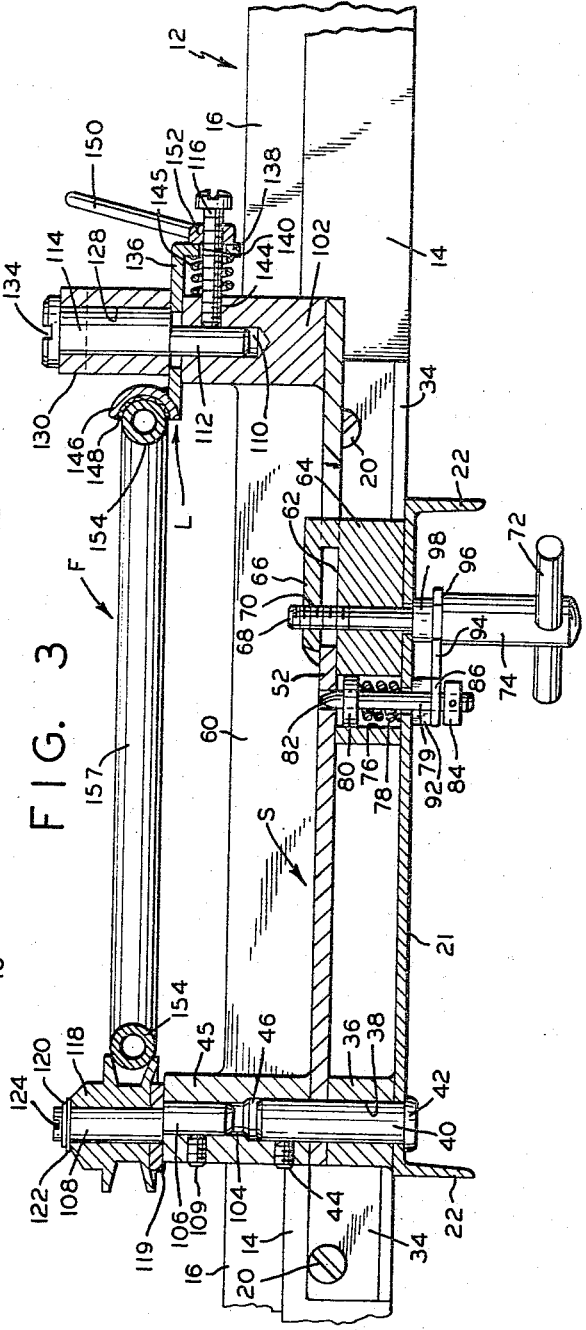
INVENTOR.
JOSEPH C. CHRISTOPHEL
BY
*Wentworth B. Clapham*
ATTORNEY.

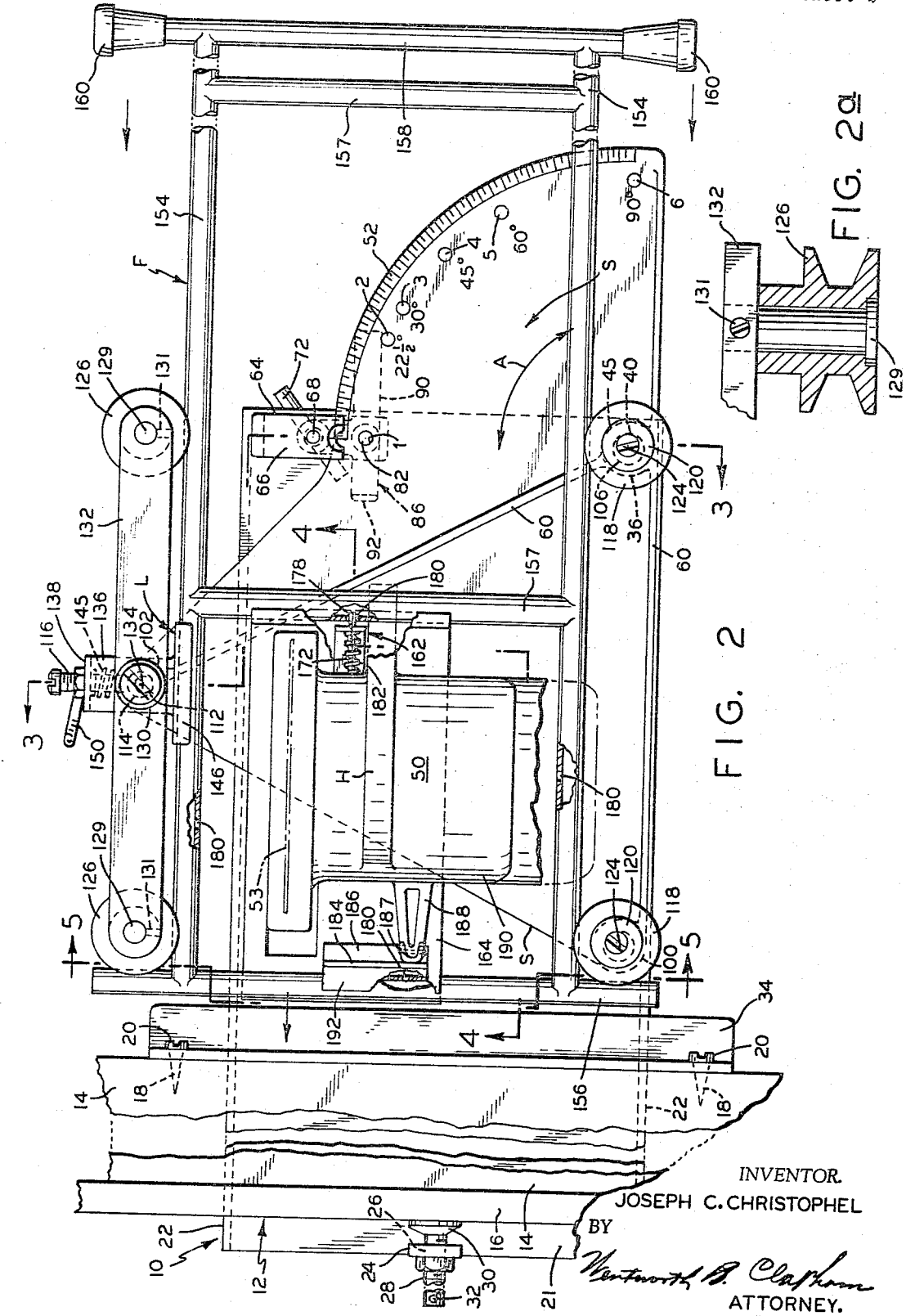

July 18, 1967  J. C. CHRISTOPHEL  3,331,406
RADIAL SAW
Filed March 3, 1964  5 Sheets-Sheet 3
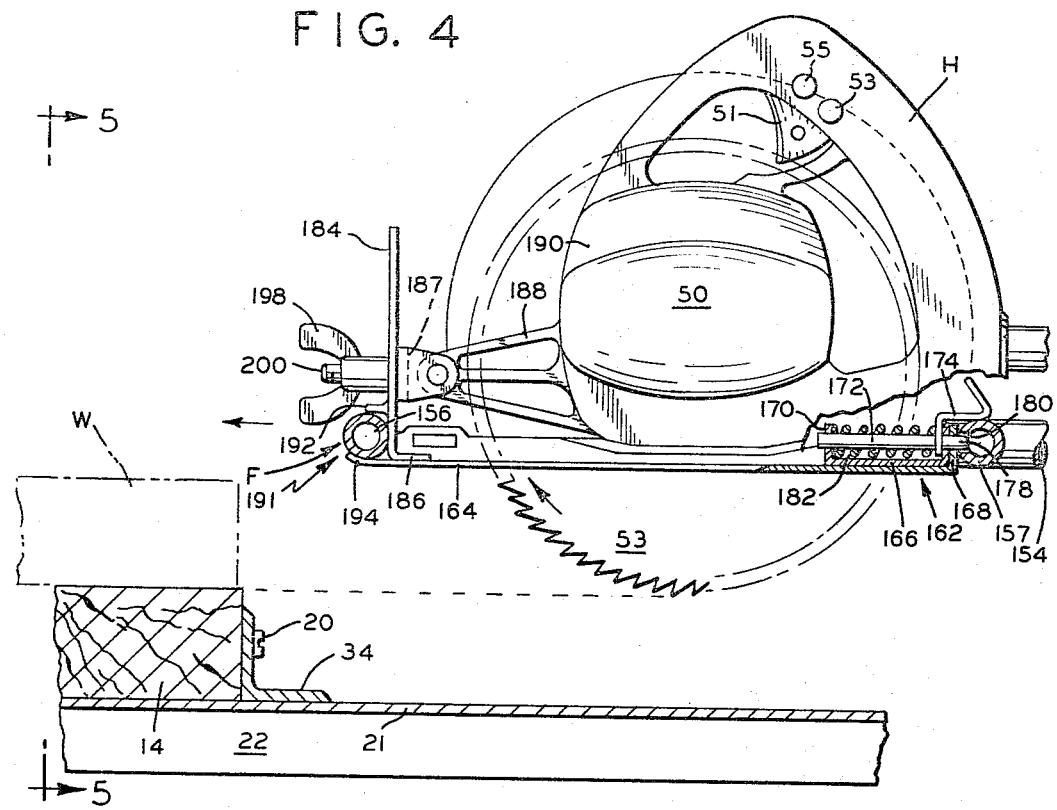
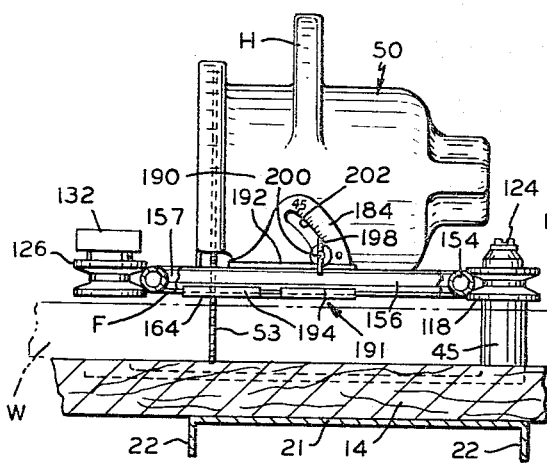 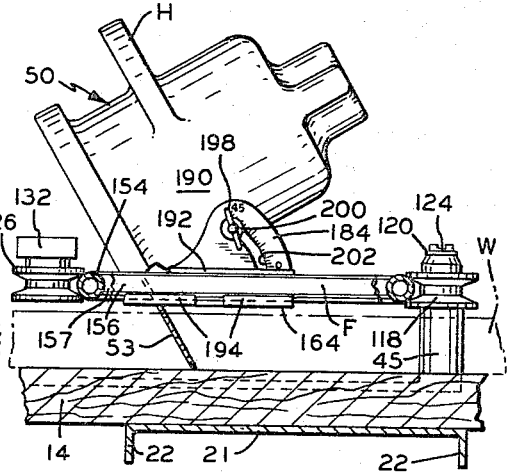
INVENTOR.
JOSEPH C. CHRISTOPHEL
BY
ATTORNEY.

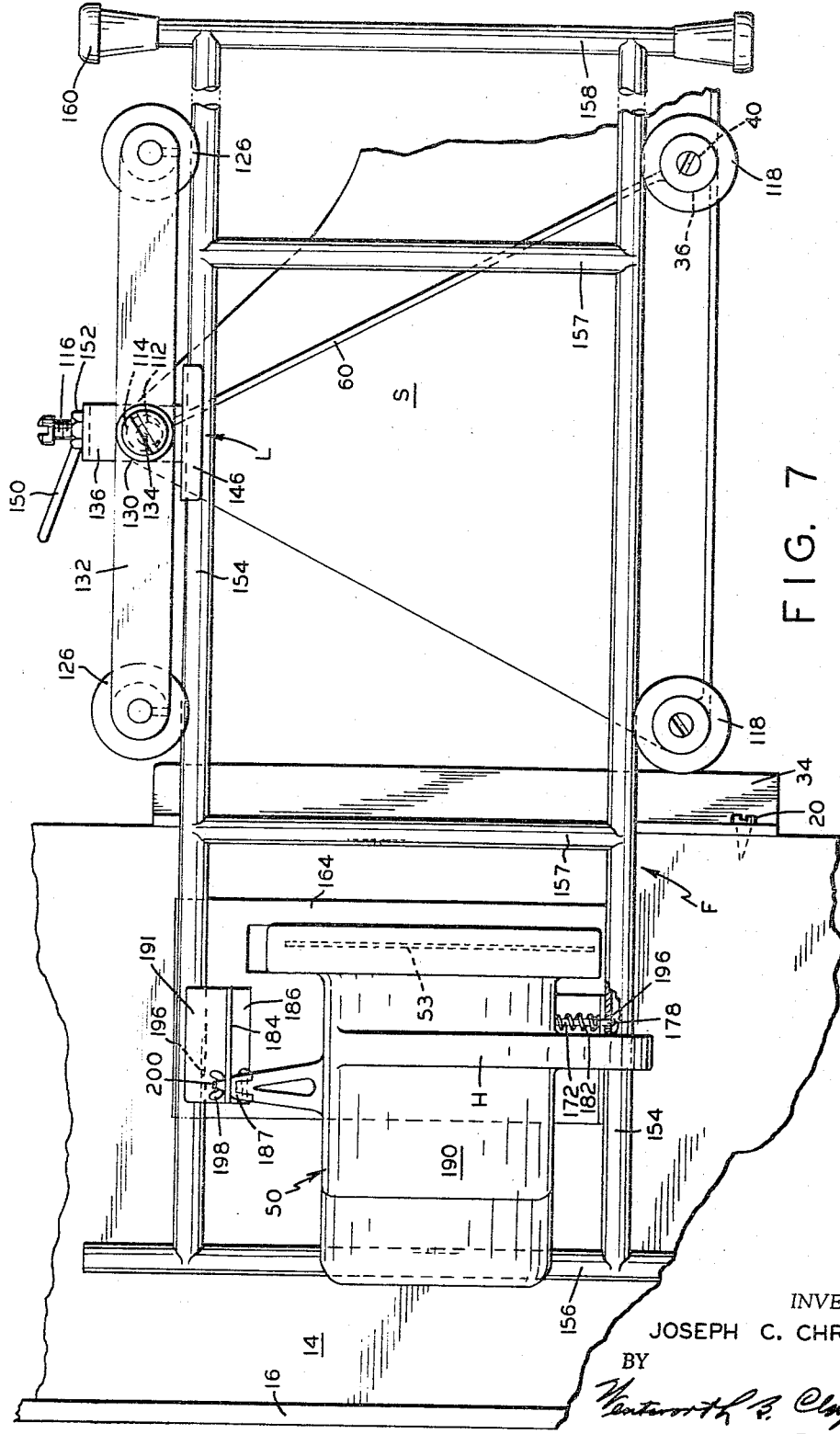

July 18, 1967
J. C. CHRISTOPHEL
3,331,406
RADIAL SAW
Filed March 3, 1964
5 Sheets-Sheet 5
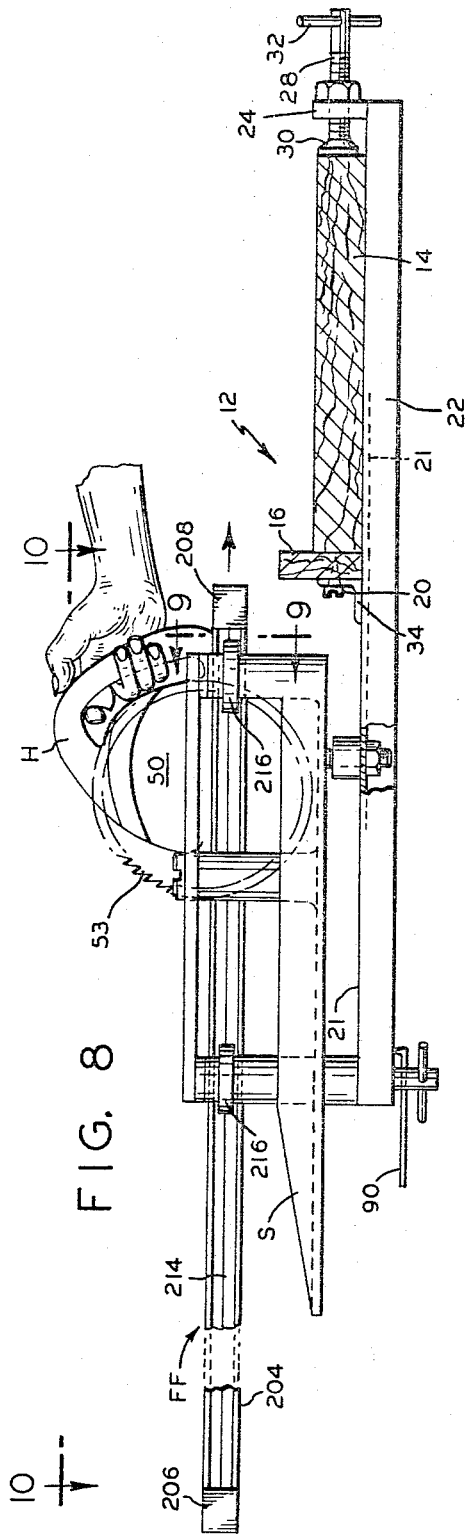
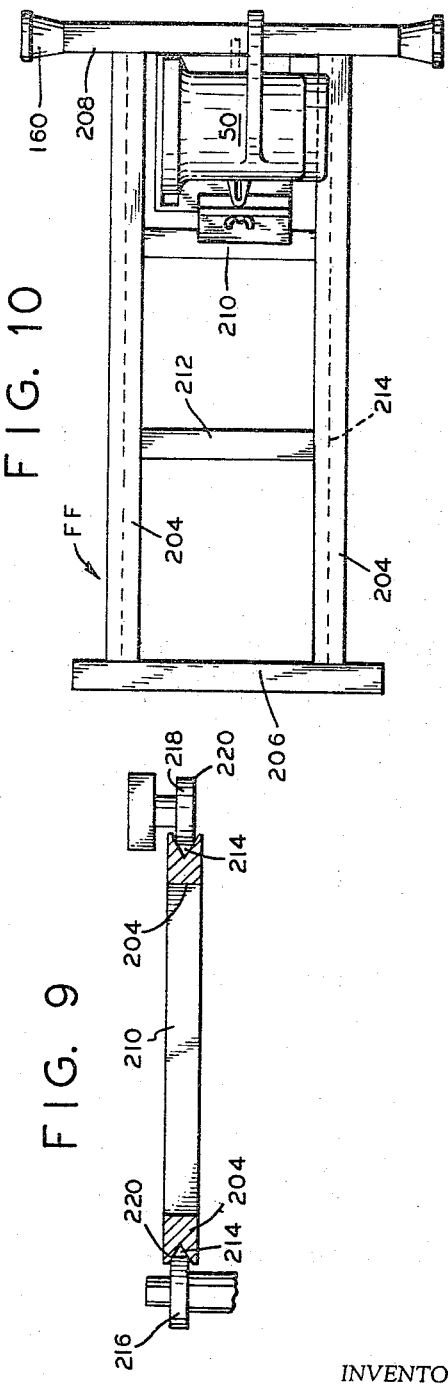
INVENTOR.
JOSEPH C. CHRISTOPHEL
BY
*Wentworth B. Clapham*
ATTORNEY.

United States Patent Office 3,331,406
Patented July 18, 1967

3,331,406
RADIAL SAW
Joseph C. Christophel, 13 Hillside Terrace,
Mountvale, N.J. 07645
Filed Mar. 3, 1964, Ser. No. 349,034
7 Claims. (Cl. 143—6)

This invention relates to radial saws, and more particularly to radial saws which are portable, and can be set up for use in a minimum of time and function either as a cross cut or as a rip saw.

Radial saws heretofore known in the art have, for the most part, been complex and heavy in construction. Saws of this type include a heavy post which supports a transverse arm or boom on which is slidably mounted a carriage provided with a motor driven saw. It will be appreciated that since the boom extends outwardly across the work supporting table, it always constitutes something of an obstruction to the easiest placement of the work in position for cutting. Also saws of this type have cost so much that they have been out of reach of the average small operator. Furthermore such saws weigh so much that they cannot readily be moved from one place to the other without a great deal of effort.

The present invention constitutes a marked improvement in the art of radial saws because a saw constructed in accordance with the invention is light weight, and is so constructed that it can be carried in one hand, and so handled by an operator that it can be used at one site, and then readily detached from its operating support and set up at another location in a minimum of time and effort. It is also of importance to note that a saw embodying the invention is of relatively low cost, and accordingly can be available at a low price to a large number of small operators. Furthermore, the saw itself can be detached from its radial support and used as a portable hand tool, whenever this is desired.

It is an object of the invention to provide a novel, lightweight and extremely versatile radial saw.

It is a further object of the invention to provide a novel radial saw wherein the saw is mounted on a reciprocatory support which can be moved back and forth across the work supporting table and wherein the work table is always clear of any obstruction when the work is being placed thereon or being removed therefrom.

The invention also consists in the provision of a novel radial saw which includes novel means for mounting the saw for making all types of cross cuts, and also for setting the saw for ripping.

The invention is further characterized by the provision of a novel radial saw having an elongated rectangular supporting frame and wherein means are provided on the frame for installing or mounting the saw for making cross cuts and for ripping.

The invention also consists in the provision of a novel radial saw construction having a supporting frame or mount on which is swivelly mounted a support having means for supporting an elongated saw carrying member, and wherein the means which support the saw carrying member are so constructed that the saw is maintained in proper operating position at all times during its operation.

The invention is further characterized by the provision of a novel saw supporting system having means for insuring that the movement of the frame which supports the saw will always travel in a plane parallel to the plane of the support table on which the work being cut is supported.

It is a further object of the invention to provide a novel radial saw construction in which a portable saw is detachably mounted on a reciprocatorily mounted frame adapted to be moved back and forth across a work table on which work to be cut is positioned, and wherein the frame is carried by a member which can be moved through an arcuate path of travel to dispose the saw blade at a selected angle for making a cut as a cross cut, a miter cut or other selected transverse cut.

With these and other objects not specifically mentioned in view, the invention consists in certain combinations and constructions which will be described fully hereinafter, and then set forth in the claims hereunto appended.

In the accompanying drawings which form a part of this specification, and in which like characters of reference indicate the same or like parts:

FIGURE 1 is a side elevation showing a preferred form of the invention.

FIGURE 2 is a plan view of the mechanism shown in FIGURE 1.

FIGURE 2a is a view partly in section of a detail showing the manner in which certain of the saw frame supporting rollers are mounted.

FIGURE 3 is a view taken on line 3—3 in FIGURE 2.
FIGURE 4 is a view taken on line 4—4 in FIGURE 2.
FIGURE 5 is a view taken on line 5—5 in FIGURE 2.
FIGURE 6 is a view similar to FIGURE 5 but with the saw shown inclined at an angle with the vertical.

FIGURE 7 is a plan view of the strutcure shown in FIGURE 1 but with the saw mounted in the supporting frame or radial arm for ripping.

FIGURE 8 is a side view of a modified form of the invention.

FIGURE 9 is a view taken on line 9—9 in FIGURE 8.
FIGURE 10 is a plan view of the structure shown in FIGURE 8.

Referring to the drawings, as illustrated a preferred embodiment of the invention comprises a relatively simple unitary construction consisting of three main parts: a base which can be detachably secured to a work bench, a movable support carried by the base which can be set such that angular cuts up to 90° can be made, and a radial arm or traverse frame reciprocably mounted in the movable support on which is detachably mounted a saw, preferably of the portable type. The mechanism includes structure by means of which both cross cuts and ripping can readily be effected.

As best shown in FIGURE 1, stationary mounting base 10 extends beneath and spans the width of work bench or table 12. This bench comprises a suitable work support member, such as an elongated plank 14, the length of which can vary in accordance with the length of the work, i.e. boards to be cut, or in order to suit the demands or requirements of available space. Bench 12 is so constructed that it provides a rigid support for base 10. It is also provided with a vertical fence, such as a board 16 suitably attached to the rear face of plank 14. This fence acts to position and align work to be sawed, and also serves as a clamping surface against which the clamping means of the base are secured.

Base 10 comprises a rigid structure in the form of an elongated channel member 21 having its flanges 22 projecting downwardly (see FIGURE 3). Suitably attached to one end of channel member 21, as by welding, is an upstanding lug 24 provided with a threaded bore 26 in which clamping screw 28 is mounted. A conventional type of swivel clamp 30 on the inner end of screw 28 (FIGURE 1) is adapted to be turned home to clamp base 10 on work bench 12 by means of handle 32 on the outer end of screw 28. In other words, screws 20 are jabbed or pressed into the front of bench 12 and drawn in by clamp screw 28 until angle 34 seats firmly against the front of bench 12. In the initial mounting of base 10 on bench 12 pins or screws 20 are pressed firmly into the front of the bench and then drawn into seated securing positions therein by clamp screw 28 when handle 32 is turned until the vertical leg of angle 34 seats firmly against the front of bench 12, as shown in FIGURE 1. In subsequent mounting of base 10 on bench 12 prior to turning handle 32 pins or screws 20 are seated in holes 18 formed by pins 20 during the initial mounting of base 10 on bench 12.

Mounting screws or pins 20, as shown in FIGURE 1, are carried in the vertical leg of an angle iron 34 suitably attached to channel member 21. Two longitudinally spaced mounting screws or pins 20 have been found to give good results. More could be used, if desired. Referring to FIGURE 1, it will be seen that all members which secure base 10 to work bench 12 are disposed completely out of the range or path of travel of the saw and that they do not project above the bench top. Also when the saw is located in its inoperative position the top of work supporting plank 14 is clear and work W can readily be placed thereon or removed without any obstruction of or by parts of the apparatus.

The saw supporting mechanism comprises the movable support, mentioned hereinabove, and the radial arm or traverse frame which carries the saw. As shown herein, the movable support is a swivel plate, designated generally S. The radial arm or traverse frame is designated generally F. Saw 50 is detachably secured in either a cross cut or a ripping position.

Channel member 21 is provided with a boss 36 (FIGURES 1, 2, 3 and 7) preferably located at an outer corner thereof. Boss 36 is formed with a vertical bore 38 in which is rotatably mounted a pivot pin 40 which supports swivel plate S for movement to any of its angular positions after which plate S is secured against movement, as described more in detail hereinafter. Pivot pin 40 is provided with a head 42 which bears against the outside of channel member 21 (FIGURE 3). A set screw 44 threadably supported in boss 46 of swivel plate S secures swivel plate S to pin 40 for rotation therewith.

Swivel plate S can have any suitable shape as long as it conforms with the general outlines of channel member 21 and forms a compact coordinated structure therewith. As illustrated herein, swivel plate S is generally triangular in shape (FIGURE 2), and has an arcuate portion 52. The design of swivel plate S is such that when it is assembled with channel member 21, it will together with frame F constitute a compact portable radial saw apparatus.

Portion 52 is graduated from 0° to 90° and serves as a protractor for readily setting the position of swivel plate S and frame F carried thereby for a selected miter cut.

Swivel plate S is provided with a three point support system. One point is defined by pivotal mount 40. The second point of support is an adjustable screw 54 threadably supported in lug 56 suitably mounted on the upper surface of channel member 21. Screw 54 extends downwardly through channel member 21 and is provided with a locking nut 57. The end of screw 54 is adjusted so as to lie in the same plane as the top of boss 36 and clamping block 64, described more in detail hereinbelow. Block 64 is formed with a supporting surface 62 coplanar with the adjusted position of screw 54 and the top of boss 36 and forms the third point of support for swivel plate S. One or more stiffening members 60 suitably attached along one or more sides of swivel plate S, as by welding, or formed integrally therewith, preventing any tendency of swivel plate S to flex or bend during sawing operations.

It will be seen that when swivel plate S is swung on its pivot pin 40 in the direction indicated by the arrow A in FIGURE 2, any selected variation in angular cross cut up to 90° can be made by saw 50.

As stated, swivel plate S and its supported frame F can be secured in any adjusted position between 0° and 90°. Referring to FIGURES 2 and 3, the under surface of protractor portion 52 of plate S rests on and is supported by shoulder 62 of a clamping block 64 suitably attached to channel member 21. This block is provided with an integral clamping finger 66 spaced from shoulder 62 a distance somewhat greater than the thickness of plate S such that the latter normally can be swung freely therebetween when finger 66 is located in its inoperative position. A locking screw 68 extending upwardly through channel member 21 and block 64, and threadably engaging a tapped bore 70 in finger 66 effects the movement of finger 66 into clamping engagement with arcuate portion 52 of plate S, when handle 72 in enlarged extension 74 of screw 68 is turned to the right, as viewed in FIGURE 3. This locking mechanism can be used in adjusting the cutting position of saw 50 relative to work to be cut under all conditions. Furthermore, due to the three point support system provided for swivel plate S, when it is positioned in operating position required for a given cut any tendency to flex is prevented, and great accuracy of cut is thereby insured.

It is well known, however, that in many trades, such as the building trade, certain miter cuts are repeated again and again in order to meet the needs of a particular job. Typical miter cuts are at angles of 22½, 30, 45, 60 degrees. Others might be stated. Therefore, in order to meet these requirements, I have provided a plurality of holes 1–6 which can be drilled or punched in portion 52 of swivel plate S. Holes 1 and 6 are located at 0 and 90 degree positions on portion 52.

The mechanism for securing swivel plate S in a selected setting at one of the positions 1–6 comprises the following: Block 64 is provided with a bore 76 in which is located a spring 78 encircling an elongated pin 79. One end of spring 78 bears against upper surface of channel member 21, as shown in FIGURE 3. Its other end presses against a collar 80 fastened to pin 79, and thereby tends normally to force the rounded nose 82 of pin 79 upwardly into a selected hole 1–6. The lower end of pin 79 projecting downwardly below channel member 21, has a collar 84 secured thereto. Pin 79 is moved out of a selected hole 1–6 by an operating lever 86 loosely mounted on pin 79. Lever 86 is formed with a manual gripping portion 90, and a turned up nose 92 which bears against the underside of channel member 21, and acts as a fulcrum for lever 86. An arm 94 of lever 86 is loosely mounted on reduced portion 98 of adjusting screw 68 between shoulder 96 beneath channel 21 (FIGURE 3). Arm 94 serves to maintain lever 86 in its proper operating position. Assume that it is desired to disengage nose 82 from one of the holes 1–6, all that is required is to release finger 66 from engagement with portion 52 of plate S, and then press down on gripping portion 90 of lever 86. This will cause nose 82 to slide out of its respective hole 1–6, whereupon swivel plate S can be moved to the next desired position and secured thereat either by means of nose 82 engaging a newly selected hole 1–6 and/or by clamping finger 66 being also turned to its locking position. Or, in a case where one of the holes 1–6 is not used, finger 66 can be moved to its locking position to hold swivel plate against movement about its pivot pin 40.

Referring now to FIGURES 1 and 2, it will be seen that swivel plate S is provided with three triangularly arranged lugs or bosses 45, 100 and 102, which can be formed integrally therewith, or attached thereto as by welding. The upper surfaces of these lugs lie in the same horizontal plane. Boss 45 has a bore 104 in which the reduced end 106 of an eccentric pin 108 is seated and secured by a set screw 109. Boss 100 which is similar to lug 45 and is located in alignment with and on the same side of plate S as lug 45. It is provided with a similar bore 104, an eccentric pin 108, and a set screw 109 (not shown) to secure pin 108 in operative position. Lug 102 is located at the apex of the isosceles triangle formed by the centers of lugs 45, 100 and 102. Lug 102 is provided with a bore 110 in which is seated a reduced portion of an eccentric pin 114 secured therein by set screw 116 (FIGURE 3).

Each eccentric pin 108 rotatably mounts a roller 118 forming a part of the mounting means for frame F. As shown in FIGURES 1, 3, 5 and 6, rollers 118 are generally V-shaped in cross section for a purpose described more in detail hereinafter. A suitable washer 119 is located between each roller 118 and the top of its support lug 45 and 100.

Rollers 118 are maintained in operative position on pins 108 by conventional snap rings 120 seated in grooves in pins 108 located above thin washers 122 encircling pins 108 above the tops of rollers 118. A transverse slot 124 formed in the top of each pin 108 provides means for turning pins 108 (when set screws 109 have been loosened) in order to effect a desired positioning adjustment of rollers 118 to and from opposed complementary rollers 126 for the purpose of either tensioning and/or securing the proper alignment of saw frame or radial arm F which is supported for rolling movement between rollers 118 and 126, and also to permit liberal manufacturing tolerances of machine parts.

Referring especially to FIGURE 3, eccentric pin 114 in lug 102 extends upwardly through bore 128 in central hub 130 of an elongated roller supporting rocker arm 132. The free ends of rocker arm 132 rotatably support rollers 126 which are similar in construction and operation to rollers 118. Rollers 126 are held in operative position by headed pins 129 which have their ends secured in the ends of rocker arm 132 by set screws 131.

The laterally spaced positions of each pair or set of complementary rollers 118, 126 which support frame F lie in lines at right angles to the longitudinal axis of frame F. The top end of pin 114 is slotted at 134 to provide means for turning pin 114 (when set screw 116 is loosened) for adjusting the tension of frame F.

As mentioned hereinabove, the radial saw embodying the invention is one which can be carried in one hand from place to place where it is desired to set it up for operation. In order that the several parts of the saw may be held properly for transportation, and also when it is desired to use the saw for ripping a novel locking and brake means is provided which is used to prevent movement of frame F under the conditions noted. Referring to FIGURES 1, 2 and 3, the locking mechanism designated generally L comprises a slotted plate 136 slidably mounted between hub 130 and the upper surface of boss 102. Plate 136 is equal in thickness to washers 119 so that the vertical centers of all rollers 118 and 126 lie in the same plane. Accordingly radial arm or traverse frame F is maintained for operation in a plane parallel to swivel plate S and base 10. In other words, when a saw embodying the invention is mounted as shown in FIGURE 1, traverse frame F will lie in a plane parallel to bench plank 14 or in a horizontal plane.

Plate 136 has a bent terminal end portion 138 having an opening through which elongated set screw 116 loosely extends. See FIGURE 3. Set screw 116 threadably engages a tapped hole 144 in boss 102. Spring 145 encircling screw 116 has one end pressing against boss 102 and its other end pressing against slide plate portion 138. The inner end of plate 136 is formed with a curved portion 146 shaped to conform with the shape of a side member 154 of frame F. Preferably curved portion 146 is somewhat elongated in order to provide a good locking surface against side member 154. It is provided with a suitable friction or braking material covering made from fibre or other similar acting material. A locking handle 150 having a hub 152 threadably engaging screw 116 can be turned to force locking portion 146 against side frame bar 154, and hold frame F against movement with a firm, yet resilient pressure. Frame F can be freed for movement merely by turning handle 150 in the opposite direction, whereupon spring 145 causes plate 136 to move to the right, as viewed in FIGURE 3, and portion 146 is disposed out of contact with frame bar 154, and traverse frame F can be moved as desired. Set screw 116 also functions to secure eccentric pin 114 in a selected adjusted position in lug 102.

As illustrated herein, radial arm or traverse frame F is rectangular in shape. Referring to FIGURES 1, 2, 3 and 7, it will be seen that frame F is made up of two laterally spaced elongated tubular side rods or bars 154 permanently connected together by a plurality of tubular cross rods or bars 156, 157 and 158. These last-named rods can be joined to side rods 154 in any suitable manner, as by welding. Cross rods 156 and 158 form the front and rear ends, respectively, of traverse frame F. Intermediate cross rods 157 are attached to side rods 154 at suitable spaced distances between end rods 156 and 158. Their number and spacing depends upon the size and length of radial arm F, and the size of the saw it is to carry. Caps 160 made from rubber or other suitable elastomeric material are mounted on the projecting ends of rods 156 and 158. In FIGURE 2 they are shown only mounted on end rod 158.

The construction of arm F is such that quick mounting on rollers 118 and 126 is possible. Caps 160 on end rod 158 (and rod 156) act to prevent damage to the projecting ends of these rods, and also to rollers 118 and 126 if for any reason during the assembly of frame F in rollers 118 and 126, or afterwards during the operation of the saw the two parts should strike each other.

As shown in FIGURES 1 and 2, cross rod 157 is spaced from end rod 156 a distance such as to provide adequate mounting space for saw 50 for cross cutting. So also side rods 154 are spaced apart a distance sufficient to accommodate saw 50 when the machine is to be used for ripping. Therefore, the opening formed by rods 154, 156 and 157 at the left end portion of radial arm F, as viewed in FIGURES 1 and 7, is a square.

Preferably saw 50 is not permanently attached to radial arm F. Instead provisions are made for detachably supporting it thereon. This enables saw 50 to be used as a separate portable tool. Any well known type of portable saw can be used. I have found that very satisfactory results can be obtained by using a portable saw made by Skil Corporation, Chicago, Ill.

In FIGURES 1, 2 and 4, saw 50 is shown mounted in frame F for cross cutting work. The saw is supported in such manner that when an operator standing in the operator's position grasps handle H and presses starting trigger 51 to close a circuit through the saw motor, traverse frame F can be moved freely away from the operator on rollers 118 and 126, and saw blade 53 will cut completely through work W resting on bench 14.

The mounting means for supporting saw 50 on frame F are so designed that a minimum of effort is needed to quickly detachably secure a saw thereto. As shown herein, saw 50 is provided with a rear end locking unit designated generally 162, (FIGURE 4), attached to shoe plate 164. This unit consists of an inverted U-shaped plate member 166, having its legs 168 and 170 provided with aligned holes through which a locking pin 172 extends (FIGURES 2 and 4). An operating thumb rest 174 attached to pin 172 adjacent leg 168 can be gripped to move locking nose 178 of pin 172 out of locking engagement with a locating hole 180 in cross rod 157 or to move nose 178 to such position that nose 178 can be positioned to move into seated position in hole 180 when saw 50 is being mounted in frame F. Spring 182 which encircles pin 172 has one end bearing against leg 170 of member 166. Its other end presses against thumb rest 174 and thereby normally tends to force pin 172 to the right, as viewed in FIGURE 4, and position nose 178 for locking engagement in a hole 180.

The front end of saw 50 is detachably secured to traverse frame F by means best shown in FIGURE 4. Saw 50 is provided with a slotted adjusting plate 184 rigidly secured to shoe plate 164 at 186. Plate 184 has a bracket 187 attached thereto which is pinned rigidly to bracket 188 on saw housing 190. An elongated seating or locking plate 192 is suitably attached to plate 184, as by welding, or, if desired, it can be formed integrally therewith. Instead of a single plate 192, a plurality of spaced relatively short members could be used. Plate 192 projects outwardly at right angles to plate 184. Shoe plate 164 is formed with an extending curved part 194 spaced vertically relative to and below plate 192 so as to form a holding yoke 191 for the front end of saw 50 when it is mounted on frame F. All that is required to mount saw 50 on frame F in the cross cut position shown in FIGURES 1 and 3 is to move saw 50 to a position relative to the front end of traverse frame F such that yoke 191 straddles front rod 156. The next operation is to move saw 50 downwardly until latch pin 172 engages in hole 180 automatically (as a door latch) in cross rod 157. This will properly locate saw 50 in frame F and push arm 174 to the left, as viewed in FIGURE 4, which will locate nose 178 of locking pin 172 such that it can move into hole 180 in cross rod 157 when saw 50 is properly positioned and arm 174 is released. The removal of saw 50 is effected merely by pushing arm to the left, as viewed in FIGURE 4, to disengage nose 178 from hole 180 in cross rod 157, and lifting up on saw 50. It can then be easily removed from front cross rod 156.

In FIGURE 7, saw 50 is shown mounted in radial arm or traverse frame F for ripping. In this case nose 178 of locking pin 172 is seated in locking engagement in hole 196 in lower side rod 154, and holding yoke 191 partially encircles a portion of upper side rod 154. When so mounted work to be ripped is fed, using fence 12 as a guide, downwardly, as viewed in FIGURE 7 against blade 53.

It will be understood that in ripping, the position of saw blade 53 relative to fence 12 depends upon the desired width of rip or cut. This can be taken care of by moving radial arm or frame F on its supporting rollers 118 and 126 until blade 53 is located in its predetermined rip position with fence 12. Then handle 150 (FIGURE 3) is tensioned on set screw 116 until locking portion 146 fixedly secures radial arm F against movement. In the same way frame F and hence saw 50 is secured against movement either to or from fence 12 during ripping action.

FIGURE 6 illustrates the position of saw 50 and blade 53 for a selected bevel cross cut. When mounted in frame F for ripping, saw 50 can be adjusted for a similar bevel type of rip cut. It will be seen that plate 184 is calibrated from 0° to 45° which is the maximum angle a bevel cut can be made with a portable saw. Wing nut 198 on bolt 200 attached to bracket 187 and extending through slot 202 is provided to secure saw 50 in its particular adjusted position. The manner of making a cross bevel cut or ripping is the same as described hereinabove.

Any desired angular cut can be made by moving i.e., swinging swivel plate S to a selected angular position, as indicated by protractor 52, and then securing swivel plate S in such position either by the engagement of nose 82 in a selected hole, or by means of clamp finger 66, as described hereinabove.

In the form of invention shown in FIGURES 1-6, base 10 is mounted on work bench 12 in such manner that the operator grips saw handle H, starts the saw and pushes it and radial arm F away from him in making cross cuts. If desired, base 10 can be detachably secured to work bench 12, as shown in FIGURE 8, in such manner that the operator can grasp handle H and pull the saw and traverse frame or radial arm F towards himself, much in the manner of a conventional radial saw. When so mounted base 10 is secured to bench 12 in the same manner as described hereinabove, except that clamp 30 engages the front face of bench 12 and pins 20 are located in the rear face thereof.

Saw 50 may be operated intermittently, as by the operator holding his finger on trigger 51. It may be operated also continuously by means of a hold-in which maintains trigger 51 in circuit closing position until it is desired to stop the saw. This mechanism is of any suitable conventional type. As shown, trigger 51 can be held in by depressing hold-in button 53. When button 55, also mounted in handle H is pressed, button 53 is released, and a spring (not shown) in handle H causes trigger 51 to move to its circuit opening position and the saw stops. Any other conventional means can be used.

The manner of mounting and supporting radial arm or traverse frame F and the coaction between rollers 118 and 126 is such that substantially line contact therebetween is provided. This construction insures against accumulations of saw dust or other extraneous materials, such as dust, and, therefore, binding of frame F in rollers 118 and 126 is practically eliminated and prevented, and wear and tear on rollers 118 and 126, and side frame rods 154 is held to a minimum. Therefore, constant adjustment of the setting of the operating positions of eccentric pins 108 and 114 is unnecessary.

FIGURES 8, 9 and 10 illustrate a modified form of radial arm or traverse frame FF constructed in accordance with the invention. Frame FF comprises elongated side frame members or bars 204 connected rigidly to end frame members or bars 206 and 208. Cross frame bars 210 and 212 are secured in the same manner, as by welding, to side bars 204, as are end frame bars 206 and 208. The arrangement and spacing of the several bars just described are the same as in the make-up of frame F. Side frame bars 204, end bars 206 and 208, and cross bars 210 and 212 are rectangular in cross section, but could have any other suitable cross-sectional design. Side frame bars 204 are provided with V-shaped centrally located slots 214 extending along the full length thereof formed in their outer faces. End frame members 206 and 208 may be provided with caps 160, as in the case of frame F, if desired. In this modified form of frame FF, rollers 216, and 218 serve the same purpose as rollers 118, and 126, and are supported in the same manner on swivel plate S. Rollers 216 and 218 are cylindrical, as shown and have sharp edges 220 running in V-slots 214 in side frame bars 204, thereby providing the same type of line contact as in the case of rollers 118 and 126 and the same beneficial results.

The length of frame FF and the number and spacing of the several end and cross bars can vary in accordance with the cutting requirements to which the apparatus is to be put and the size of the saw it mounts. Saw 50 shown in FIGURES 8 and 10 can be detachably secured to frame FF for cross cutting or ripping in the same manner as described in connection with the form shown in FIGURES 1-6, and described hereinabove.

Frame FF is locked and held against movement on rollers 216, 218 by means of a locking clamp (not shown) similar in construction and operation as locking clamp L (FIGURES 1, 2 and 3). The only difference is that the shape of the portion which engages a side frame bar 204, and clamps it against movement is generally V-shaped in order to conform with that of bar 204.

A device embodying the invention is simple in construction and operation. My novel radial saw is light weight and, therefore, an operator can carry it without difficulty or inconvenience from one place to another where it is to be set up and operated. Its construction affords ready access to work to be cut on the work bench or table on which it is mounted with a minimum of effort. The device is extremely versatile in use due at least in part to the fact that a portable saw is used and the latter can readily be removed from the radial arm and used as a portable unit. Furthermore, an apparatus embodying the invention makes it possible to secure the same results in a simpler manner than those usually obtained with a complex, high cost, post type of radial saw.

What is claimed is:

1. In a cutting apparatus adapted to be detachably secured to a work bench, a base, said base having spaced, inwardly directed pointed members for engaging a selected portion of one side of said bench and clamping means on said base and spaced from said members for engaging an opposite portion of said bench, said clamping means when turned tight against said opposite portion of said bench force said members into said selected portion of said bench and effect the detachable securing of said base to said bench and in aligned relation therewith, said base comprising an elongated rigid planar member extending beneath and spanning said bench and having a part projecting outwardly beyond a selected side of said bench, a swivel plate carried by said projecting part of said member, a plurality of longitudinally arranged laterally spaced supporting means carried by said plate, an elongated frame reciprocably supported in said last-named means, a saw carried by said frame, and means for driving said saw.

2. The invention defined in claim 1, wherein said supporting means for said frame comprise low friction rollers, and said rollers are cylindrical in form, and said side rods are formed with generally V-shaped grooves extending along the length of said side rods on their outer faces to provide supporting surfaces by means of which they are carried in substantial line contact on said rollers.

3. In a device of the type described, in combination, a base adapted to be mounted on either side of a bench, said base comprising an elongated platform portion extending beneath said bench and outwardly from a selected side of said bench, an elongated radial arm, a saw, means detachably mounting said saw on said radial arm for cutting operations corresponding to the mounted position of said base on said bench, support means for said radial arm carried by said base, said support means comprising an elongated plate approximately equal in width to the width of said base, a single pivotal mount for said plate providing for movement of said plate about a single vertical axis in a plane parallel to the plane of said platform portion, and said support means also including spaced low friction elements engaging opposite sides of said radial arm and having substantially line contact therewith and maintaining said arm for free reciprocatory travel forwardly and backwardly above said bench and in a plane parallel to the plane of said bench in cutting work on said bench, and means carried by said base for securing said base to said bench with said securing means located out of the path of travel of said radial arm and saw carried thereby.

4. A device of the type described comprising in combination, a base adapted to be mounted on a bench, said base being mounted beneath said bench and having a portion thereof extending therebeyond, means attaching said base to either of two opposite sides of said bench, an elongated traverse frame comprising laterally spaced elongated side rods, and cross rods connected to the ends of said side rods, a saw carried by said traverse frame, means mounting said saw on said traverse frame for cutting operations relative to work on said bench corresponding to the mounted position of said base on said bench, said mounting means constraining said traverse frame for movement in a single plane only substantially parallel to the plane of said bench, and said mounting means comprising low friction, generally V-shaped rollers, means mounting said rollers on said base with their axes in vertical planes and constructed and arranged to have substantially line contact only with said elongated side rods of said traverse frame to thereby minimize the possibility of accumulation of extraneous matter, such as saw-dust and dirt, which would tend to interfere with the free movement of said traverse frame on said rollers, and means for driving said saw.

5. In a device of the type described, in combination, a base adapted to be mounted on a bench, said base comprising an elongated platform portion extending outwardly from one side of said bench, an elongated radial arm, a saw, means mounting said saw on said arm, support means for said radial arm carried by said base, said support means comprising an elongated plate approximately equal in width to the width of said base, a pivotal mount for said plate providing for movement of said plate about a vertical axis in a plane parallel to the plane of said platform portion, and said support means also including spaced low friction elements engaging opposite sides of said radial arm and maintaining said arm free for reciprocatory travel forwardly and backwardly above said bench and in a plane parallel to the plane of said bench in cutting work on said bench, means carried by said base for securing said base to said bench with the securing means located out of the path of travel of said radial arm and saw carried thereby, said plate being provided with opposed substantially transversely aligned sets of low friction rollers adapted to engage and support opposite sides of said radial arm, and said rollers being mounted along opposite sides of said plate, means fixedly pivotally securing each of said rollers on one side of said plate, a rocker bar for the rollers at the other side of said plate, and means for pivotally mounting said bar centrally of its length with the line passing through the axis of each of said last-named rollers substantially parallel with the line passing through the axes of said first-named rollers.

6. The invention defined in claim 5, including means for adjusting the operating position of each of said rollers to properly align said radial arm for travel normally in a line at right angles to the longitudinal axis of said bench.

7. A portable radial saw for use with a saw bench having a substantially horizontal work supporting section and a substantially vertical fence, comprising a base, a radial arm, a saw mounted on said arm, a support for said radial arm carried by said base, said support having means mounting said arm for free reciprocatory travel across said section of said bench, means carried by said base for mounting it beneath said bench with said mounting means out of the path of travel of said radial arm as it is moved back and forth above said section on cutting work, means normally positioning said support on said base with said radial arm located at right angles to the longitudinal axis of said section, means on said support for aligning said radial arm properly relative to said bench, said support including generally V-shaped rollers located at opposite sides of said plate engaging opposite sides of said radial arm for reciprocatory movement, individual eccent-pin mounts for each of said rollers on one side of said plate, a common support for the rollers at the other side of said plate, including an elongated rocker bar, a boss seating an eccentric pin supporting said rocker bar centrally of its length with the rollers mounted at the free ends of said bar, means for turning each of said eccentric pins to position each of said rollers and the central support of said rocker bar such that the path of travel of said radial arm back and forth across and above said section of said bench is at right angles to the longitudinal axis of said bench, and means for securing each of said eccentric pins in its adjusted position.

References Cited

UNITED STATES PATENTS

| | | | |
|---|---|---|---|
| 2,306,512 | 12/1942 | Whitney | 143—6 |
| 2,602,474 | 7/1952 | Truchan | 143—6 |
| 2,708,463 | 5/1955 | Coleman | 143—6 |
| 2,902,066 | 9/1959 | Borden | 143—6 X |
| 2,941,554 | 6/1960 | Long | 143—6 |
| 3,073,360 | 1/1963 | Villanueva | 143—6 |

DONALD R. SCHRAN, *Primary Examiner.*